United States Patent [19]

Guether et al.

[11] Patent Number: 5,401,697

[45] Date of Patent: Mar. 28, 1995

[54] PROCESS FOR CONVERTING WATER-SENSITIVE CERAMIC POWDERS INTO A FREE-FLOWING GRANULATED POWDER

[75] Inventors: Hans-Michael Guether, Kelkheim; Katharina Seitz, Frankfurt; Friedrich Hessel, Mainz; Frank Schroeder, Huerth; Christine Koestler, Bad Soden; Andreas Roosen, Hofheim, all of Germany

[73] Assignee: Hoechst Aktiengesellschaft, Frankfurt am Main, Germany

[21] Appl. No.: 117,790

[22] Filed: Sep. 8, 1993

[30] Foreign Application Priority Data

Sep. 8, 1992 [DE] Germany .................. 42 30 017.7

[51] Int. Cl.$^6$ .............................................. C04B 35/58
[52] U.S. Cl. ....................................... 501/98; 501/88; 501/94; 501/127; 423/412
[58] Field of Search ............... 501/88, 96, 98, 127, 501/94; 423/412

[56] References Cited

U.S. PATENT DOCUMENTS 4,540,677 9/1985 Enomoto et al. .................. 501/88 X
5,049,367 9/1991 Nakano et al. .................... 501/96 X

FOREIGN PATENT DOCUMENTS

WO89/12505 12/1989 WIPO .

OTHER PUBLICATIONS

Patent Abstracts of Japan, vol. 013, No. 021 (C-560)18. Jan. 1989 & JP-A-63 225 507, Sep. 1988.
Chemical Abstracts, vol. 111, No. 6, Aug. 7, 1989, U.S. Abstract No. 44266f, "Free Flowing Granulated . . . ", & JP-A-1 061 362, Mar. 8, 1989.
Database WPI, Section Ch, Week 9104, Derwent Publications Ltd., London, GB; Class A32, AN91-026261 & JP-A-2 296 708, Dec. 7, 1990.
Patent Abstracts of Japan, JP2088412, Mar. 28, 1990, & JP880238421, Sep. 22, 1988.

*Primary Examiner*—Karl Group
*Attorney, Agent, or Firm*—Foley & Lardner

[57] ABSTRACT

A method of processing water-sensitive ceramic powders, particularly carbothermically produced aluminum nitride, whereby the ceramic powder is deagglomerated in a dry milling step with addition of an alkylamine which is liquid at room temperature is disclosed. The alkylamine is added in an amount sufficient to produce a monomolecular layer on the surface of the ceramic powder. The deagglomerated powder subsequently is vigorously stirred with a concentrated aqueous solution or dispersion of binder and rapidly and gently dried, preferably by freeze drying. Aluminum nitride powder prepared by this process can be further processed into shaped parts with a high thermal conductivity.

19 Claims, No Drawings

PROCESS FOR CONVERTING WATER-SENSITIVE CERAMIC POWDERS INTO A FREE-FLOWING GRANULATED POWDER

BACKGROUND OF THE INVENTION

1. Field of the Invention

The present invention relates to a process for converting water-sensitive ceramic powders into a free-flowing granulated powder. In particular the invention relates to a procedure for processing aluminum nitride powder.

2. Description of Related Art

In the production of shaped technical ceramic parts the ceramic powder is first processed before it is formed into a green body and the green body is sintered.

Fine powders are prone to agglomerate as a result of surface forces with or without chemical bonding, making the processing into a green body difficult or impossible, since the agglomerated powder is not free-flowing and this leads to inhomogeneities in the microstructure of the sintered ceramic. Hence every production process for shaped ceramic parts requires specific powder processing in which the powder is deagglomerated. A controlled agglomeration can subsequently be carried out in the powder processing to obtain a free-flowing granulated powder with a desired specification. Free-flowing granulated powders are used, for example, if the forming of the green body is by pressing.

If the green body is densified by pressureless liquid phase sintering, the processing of the powder also serves to distribute a sintering aid homogeneously in the ceramic powder.

One way of powder processing comprises wet milling in water with subsequent spray drying to give a free-flowing granulated powder. In the case of some ceramic powders this type of powder processing with water can lead to undesirable changes in the material. In the case of aluminum oxide powder, for example, the surface can be so changed by water that the processing behavior of the material in injection molding is unfavorably affected. A particular problem arises in processing aluminum nitride powder with water, since aluminum nitride powder is very sensitive to hydrolysis. The hydrolysis leads to a substantial reduction in the thermal conductivity of the aluminum nitride ceramic. Since aluminum nitride ceramic, because of its very good thermal conductivity, is finding increasing application in electronics, for example as substrate material in microelectronics, hydrolysis must be prevented in the production process of shaped parts made of aluminum nitride powder.

One way of preventing the hydrolysis of aluminum nitride powder during processing comprises the use of organic dispersing media for powder processing. However organic dispersing media have the disadvantage that they are harmful to health and/or the environment, or form explosive mixtures with air.

Another possibility is to coat the aluminum nitride powder in order to avoid direct contact between powder and water during powder processing. However, the coated powder, coated for example with polymers or fatty acids, is then barely dispersible in water, if at all. Other coatings can give problems during burnout or sintering, if relatively large amounts of these additives need to be removed.

EP 377 701 describes a process for wet milling of ceramic powders, in particular zirconium dioxide, in which the milling is carried out in the presence of ammonia or alkylamines with boiling points of not more than 100° C. These dispersants are added to the powder suspended in water in sufficient quantity for the mill slip to have a sufficiently fluid consistency. In the case of ammonia and gaseous alkylamines, the dispersants are added in the form of aqueous solutions.

SUMMARY OF THE INVENTION

An object of the present invention is to provide a process of the type mentioned at the outset, which avoids undesirable changes in the ceramic powder during processing without having to rely on the use of organic dispersion media.

This object is achieved on the basis of the process mentioned at the outset when the ceramic powder is deagglomerated in a dry milling step with addition, in an amount sufficient to give a monomolecular layer on the surface of the ceramic powder, of at least one alkylamine which is liquid at room temperature and the deagglomerated powder is vigorously stirred with a concentrated aqueous solution or dispersion of binder and is subsequently dried rapidly at temperatures below 50° C.

DETAILED DESCRIPTION

The process can be applied to ceramic powders in which prolonged contact with water leads to undesirable changes, for example aluminum oxide. The process is particularly suitable for carbothermically produced aluminum nitride powder which is sensitive to hydrolysis. It has been found that carbothermically produced aluminum nitride is not hydrolyzed appreciably on short contact with water. The hydrolysis of the powder only begins after about 10 minutes. This can be determined by measurement of the conductivity and the pH, which can be viewed as measures of the decomposition of aluminum nitride in water. Both values rise steeply as a result of hydrolysis.

The process of the invention therefore reduces the contact of the ceramic powder with water during processing to a minimum, with respect to time and amount, compared with the conventional processing in water. Deagglomeration is carried out without water in a dry milling step. The presence of the alkylamine effects optimal deagglomeration in the dry milling step and, if a sintering aid is to be incorporated, a good homogeneous distribution of the sintering aid in the ceramic powder. The dry milling step can employ conventional milling devices, for example ball mills.

Only during the introduction of the binder in the form of a concentrated aqueous solution or dispersion does the deagglomerated ceramic powder come into contact with a small amount of water for a short time. In order to keep the contact time as short as possible the powder is vigorously stirred. The solution or dispersion of binder is fed into the powder in a granulator/mixer with a rapidly rotating agitator. The concentrated aqueous solution or dispersion of binder is preferably sprayed into the powder while it is being vigorously stirred. A free-flowing granulated material is obtained within no more than 10 minutes.

The granulated material is subsequently dried at temperatures below 50° C. Drying must be carried out as quickly and gently as possible. Temperatures substantially below 50° C. are preferred. High frequency drying, microwave drying and freeze drying are particularly suitable.

The free-flowing granulated powder so obtained, which has an average particle size in the range of from 20 to 500 μm and particularly in the range of from 50 to 250 μm, can be pressed by conventional dry pressing methods to form a green body which is densified to give the shaped part by subsequent sintering, for example in a nitrogen atmosphere at about 1850° C.

The process of the invention achieves minimal contamination of the green and sintered body by oxygen compounds due to hydrolysis. In the case of aluminum nitride, shaped parts with a high thermal conductivity of above 150 W/mK are obtained.

If sintering is to be pressureless, a sintering aid is added to the ceramic powder during processing which becomes distributed homogeneously in the ceramic powder during the dry milling step. Possible sintering aids are, for example, oxides of the rare earth metals, in particular yttrium oxide ($Y_2O_3$).

The alkylamines used are liquid at room temperature. Primary and secondary alkylamines having from 2 to 8 carbon atoms per alkyl group are particularly suitable, straight-chain alkyl groups being preferred. Primary alkylamines having from 2 to 6 carbon atoms and especially butylamine are particularly preferred.

The alkylamines must be added in an amount sufficient to give a monomolecular layer on the surface of the ceramic powder and the sintering aid if added. The required amount is thus determined by the specific surface area of the ceramic powder used. The amount of alkylamine used increases with increasing specific surface area of the ceramic powder used. Aluminum nitride powders generally have an average particle size of from 0.5 to 5 μm, in particular from 1 to 2 μm, and a specific surface area of from 1 to 10 $m^2/g$. Amounts appreciably greater than those required for a monomolecular surface layer should not be used, so as to introduce into the material as little as possible of substances will have to be removed during subsequent sintering. The amount of alkylamine added is generally from 0.1 to 1.5% by weight, based on the ceramic powder or on the mixture of ceramic powder and sintering aid.

Preferred binders are water-soluble binders which have a low solution viscosity and hence make possible a high binder content in the aqueous binder solution. Aqueous binder dispersions can also be used. The binder content of the solution or dispersion is preferably from 25 to 40% by weight and particularly from 30 to 40% by weight. The binder should furthermore have a low moisture absorption, so as to guarantee a good shelf life of the granulated powder produced. Examples of suitable binders are polyvinyl alcohols, cellulose derivatives and polyester-modified polyurethane resins, and also polymer dispersions based on acrylates/methacrylates.

The solution or dispersion of binder is generally added in an amount such that the binder content is from 3 to 5% by weight, based on the solids content of the mixture.

In addition to the binder, pressing aids such as oleic acid, polyethylene glycol or waxes, can be added to the deagglomerated ceramic powder together with the binder.

The invention is illustrated by the examples below.

EXAMPLE 1

Dry Milling Step 100 g of AlN powder with a specific surface area of 3.2 $m^2/g$ and a particle size distribution of $d_{90}=3.8$ μm, $d_{50}=1.45$ μm, $d_{10}=1$ μm, containing 3% by weight of $Y_2O_3$, are admixed with 0.2% by weight of butylamine and milled for 24 hours in a milling vessel with 400 g of milling media. The powder obtained is isostatically pressed to give a test body. Chemical analysis shows a homogeneous distribution of the $Y_2O_3$ in the AlN.

COMPARATIVE EXAMPLE 1

Dry Milling Step

The procedure of Example 1 is repeated, except that 0.05% by weight instead of 0.2% by weight of butylamine is added. The powder obtained is isostatically pressed to give a test body. Chemical analysis shows an inhomogeneous distribution of the $Y_2O_3$ in the AlN.

EXAMPLE 2

Granulation Step

A granulator-mixer (manufactured by Eirich) is charged with 2800 g of the powder obtained according to Example 1. 57 g of polyester-modified polyurethane resin (®Daothan VTW 1226, produced by Hoechst AG) in 95 ml of water is sprayed over a period of 2 min into the powder being vigorously stirred in the granulator-mixer. The material is subsequently stirred for a further 1 min. The granulated material obtained is transferred from the granulator-mixer into a freeze dryer and there freed of water.

EXAMPLE 3

Production of the Shaped Part 5 g of the granulated powder obtained in Example 2, having an average particle size of 100 μm, are filled into a die and pressed at a pressure of 1000 bar to give a tablet-shaped green body having a density of 60% of the theoretically achievable green density. The green body is subsequently sintered at 180° C. for 3 hours under nitrogen. The shaped part has a thermal conductivity of 160 W/mK.

COMPARATIVE EXAMPLE 2

Granulation Step

Example 2 is repeated, except that the granulated material obtained in the granulator-mixer is not dried in a freeze dryer but in a circulating-air drying cabinet at 60° C. for 1 hour.

The dried granulated material obtained smells strongly of ammonia, the granules are completely destroyed and a pressing experiment is no longer possible.

What is claimed is:

1. A process for converting water-sensitive ceramic powder into a free-flowing granulated powder comprising;
    (a) deagglomerating the ceramic powder in a dry milling step, whereby at least one alkylamine which is liquid at room temperature is added in an amount sufficient to produce a monomolecular layer on the surface of the ceramic powder, and wherein said alkylamine comprises primary or secondary alkylamines having from 2 to 8 carbon atoms per alkyl group;

(b) vigorously stirring the deagglomerated powder with a concentrated aqueous solution or dispersion of a binder; and (c) subsequently drying rapidly at temperatures below 50° C.

2. Process as claimed in claim 1, wherein the ceramic powder comprises carbothermically produced aluminum nitride.

3. Process a claimed in claim 1, where the ceramic powder is dry milled together with a sintering aid.

4. Process as claimed in claim 3, wherein the sintering aid comprises yttrium oxide.

5. Process as claimed in claim 1, wherein the primary alkylamines comprise alkylgroups having from 2 to 6 carbon atoms.

6. Process as claimed in claim 5, wherein the primary alkylamine comprises butylamine.

7. Process as claimed in claim 1, wherein the alkylamine is added in an amount from 0.1 to 1.5% by weight, calculated on total weight of the ceramic powder.

8. Process as claimed in claim 3, wherein the alkylamine is added in an amount from 0.1 to 1.5% by weight, calculated on total weight of the ceramic powder and the sintering aid.

9. Process as claimed in claim 1, wherein an aqueous solution of the binder is sprayed into the agglomerated powder while stirring.

10. Process as claimed in claim 1, wherein an aqueous dispersion of the binder is sprayed into the agglomerated powder while stirring.

11. Process as claimed in claim 1, wherein the binder comprises a polyester-modified polyurethane resin.

12. Process as claimed in claim 1, wherein the concentration of the binder lies within the range of about 30 to about 40% by weight, claculated on total weight of the binder solution or dispersion.

13. Process as claimed in claim 1, wherein the drying is effected by high frequency.

14. Process as claimed in claim 1, wherein the drying is effected by microwave.

15. Process as claimed in claim 1, wherein the drying is effected by freeze drying.

16. A process for converting water-sensitive ceramic powder into a free-flowing granulated powder comprising:

(a) deagglomerating a ceramic powder in a dry milling step, whereby at least one alkylamine which is liquid at room temperature is added in an amount sufficient to produce a monomolecular layer on the surface of the ceramic powder, wherein said water-sensitive ceramic powder is a ceramic powder in which prolonged contact with water will lead to undesirable changes in the powder, and wherein said alkylamine comprises primary or secondary alkylamines having from 2 to 8 carbon atoms per alkyl group;

(b) vigorously stirring the deagglomerated powder with a concentrated aqueous solution or dispersion of a binder; and (c) subsequently drying rapidly at temperatures below 50° C.

17. The process as claimed in claim 16, wherein said water-sensitive ceramic powder is aluminum oxide or carbothermically produced aluminum nitride.

18. The process as claimed in claim 1, wherein the free-flowing granulated powder produced has an average particle size in the range of from 50 to 250 μm.

19. The process as claimed in claim 16, wherein the free-flowing granulated powder produced has an average particle size in the range of from 50 to 250 μm.

* * * * *